(12) United States Patent

McCovick et al.

(10) Patent No.: US 7,435,765 B2
(45) Date of Patent: Oct. 14, 2008

(54) ADDITIVE FOR INK JET INK

(75) Inventors: Tammy A. McCovick, Hilton, NY (US);
Hwei-Ling Yau, Rochester, NY (US);
Robert O. James, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 85 days.

(21) Appl. No.: 10/313,368

(22) Filed: Dec. 6, 2002

(65) Prior Publication Data

US 2004/0110865 A1 Jun. 10, 2004

(51) Int. Cl.
*C09D 11/00* (2006.01)

(52) U.S. Cl. .................. 523/160; 523/161; 524/445; 524/447; 524/556; 524/590; 524/601

(58) Field of Classification Search ................ 523/160, 523/161; 524/445, 447, 556, 590, 601, 301
See application file for complete search history.

(56) References Cited

U.S. PATENT DOCUMENTS

| | | | |
|---|---|---|---|
| 4,156,616 A | 5/1979 | Dietz et al. | |
| 4,335,029 A | 6/1982 | Dabi et al. | |
| 4,501,852 A * | 2/1985 | Markusch et al. | 524/591 |
| 5,026,427 A | 6/1991 | Mitchell et al. | |
| 5,086,698 A | 2/1992 | Wirz | |
| 5,141,556 A | 8/1992 | Matrick | |
| 5,160,370 A | 11/1992 | Suga et al. | |
| 5,169,436 A | 12/1992 | Matrick | |
| 5,279,654 A | 1/1994 | Keirs et al. | |
| 5,324,349 A | 6/1994 | Sano et al. | |
| 5,651,813 A | 7/1997 | Santilli et al. | |
| 5,670,139 A | 9/1997 | Allard et al. | |
| 5,679,138 A | 10/1997 | Bishop et al. | |
| 5,714,993 A | 2/1998 | Keoshkerian et al. | |
| 5,716,436 A | 2/1998 | Sorriero et al. | |
| 5,804,613 A * | 9/1998 | Beall et al. | 523/200 |
| 5,837,045 A | 11/1998 | Johnson et al. | |
| 5,889,083 A * | 3/1999 | Zhu | 523/161 |
| 5,891,611 A | 4/1999 | Majumdar et al. | |
| 5,922,118 A | 7/1999 | Johnson et al. | |
| 5,942,560 A | 8/1999 | Idogawa et al. | |
| 6,030,438 A | 2/2000 | Erdtmann et al. | |
| 6,040,358 A * | 3/2000 | Page et al. | 523/161 |
| 6,152,999 A | 11/2000 | Erdtmann et al. | |
| 6,210,474 B1 | 4/2001 | Romano, Jr. et al. | |
| 6,475,602 B1 | 11/2002 | Kapusniak et al. | |
| 6,492,006 B1 | 12/2002 | Kapusniak et al. | |
| 6,497,941 B1 | 12/2002 | Landry-Coltrain et al. | |
| 6,503,607 B1 | 1/2003 | Landry-Coltrain | |
| 6,533,408 B1 * | 3/2003 | Erdtmann et al. | 347/100 |
| 6,866,379 B2 * | 3/2005 | Yau et al. | 347/100 |
| 2002/0025994 A1 | 2/2002 | Ishizuka et al. | |
| 2002/0032252 A1 | 3/2002 | Ishizuka | |
| 2002/0058740 A1 * | 5/2002 | Lorah et al. | 524/445 |
| 2002/0096089 A1 | 7/2002 | Bergemann et al. | |
| 2003/0131755 A1 * | 7/2003 | Chen et al. | 106/31.6 |
| 2003/0176533 A1 * | 9/2003 | Cottrell et al. | 523/160 |
| 2003/0184629 A1 * | 10/2003 | Valentini et al. | 347/100 |
| 2004/0085419 A1 * | 5/2004 | Yau et al. | 347/100 |

FOREIGN PATENT DOCUMENTS

| | | |
|---|---|---|
| EP | 1134261 A1 | 9/2001 |
| GB | 2351292 A | 12/2000 |
| JP | 2000-290533 | 10/2000 |
| JP | 2001-294789 | 10/2001 |

OTHER PUBLICATIONS

Lewis, Jr., Richard J.; Hawley's Condensed Chemical Dictionary 13th Ed., John Wiley & Sons, New York, 1997 (p. 122).*
"Aqueous Polyurethane Dispersions" B.K. Kim, Colloid & Polymer Science, vol. 274, No. 7 (1996) 599-611 Steinopff Verlag 1996.

* cited by examiner

*Primary Examiner*—Bernard Lipman
(74) *Attorney, Agent, or Firm*—Doreen M. Wells; Sarah Meeks Roberts; Chris P. Konkol

(57) ABSTRACT

An ink jet ink composition comprising from about 30 to about 90% by weight of water, from about 0.5 to about 30% by weight of a pigment, from about 0.1 to about 10% by weight of natural or synthetic smectite clay mineral.

46 Claims, No Drawings

ADDITIVE FOR INK JET INK

CROSS REFERENCE TO RELATED APPLICATION

Reference is made to commonly-assigned, copending U.S. patent application Ser. No. 10/313,570, filed on even date herewith, entitled "Aqueous Pigmented Ink Formulation Containing Polymer-Encapsulated Pigments, Binder and Smectite Clay Particles," the teachings of which are incorporated herein by reference.

FIELD OF THE INVENTION

This invention relates to additives for a pigmented ink jet ink to improve the image quality of printed elements.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. To generate full color prints via ink jet printing, ink sets comprising at least cyan, magenta and yellow inks are normally utilized. In addition, a black ink is often added to enhance the printing of text and darker colors. The range of colors that can be produced with a given set of inks defines the color gamut of that ink set. For the production of high quality photorealistic images via ink jet printing, ink sets with a large color gamut are preferred. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor light-fastness on ink jet porous glossy receivers. In pigment-based inks, the colorant exists as discrete particles. These pigment particles may be self-dispersed or treated with addenda known as dispersants or stabilizers, which serve to keep the pigment particles from agglomerating and settling out of the carrier. Milling process is often utilized to obtain pigment particles of desirable size, from 10 nm to 200 nm for inkjet ink application. Water-based pigmented inks are prepared by incorporating the pigment in the continuous water phase by a milling and dispersing process. Pigmented inks require a water-soluble dispersant in the pigment slurry during the milling process. Such a dispersant is necessary to produce a colloidally stable mixture and ink that can be "jetted" reliably without clogging the print head nozzles. The dispersant may be polymeric or non-polymeric to perform the function. Such a polymeric dispersant may be a block polymer or a random polymer.

Pigment-based inks in general have better image stability such as light fastness as compared to dye-based inks. However, when the pigment-based inks are printed on recording elements having glossy surfaces, the inks on the imaged areas tend to stay on the surface of the receiver. Due to the poor dry and wet adhesion properties between pigment particles and receiver surface, images generated by printing pigment-based inks on glossy receivers can be easily smudged. These scratch marks and smudges are more visible for receivers of high gloss levels.

To provide an image produced by pigmented ink with rub and smudge resistance on glossy receivers, polymer additives are often used. However, when a high level of polymer is used in pigmented ink to get satisfactory print durability, print defects in highly inked area are observed. The defects result from the slow absorption of inks by the receiver, therefore inks flow in the direction of receiver surface, producing density fluctuations. A common solution to this problem is to slow down printing speed or lower the level of polymer used in ink. These solutions either compromise productivity or print durability.

It is an object of this invention to provide an ink jet ink that allows high speed printing of pigmented inks to produce images having rub and smudge resistance on glossy receivers without any undesirable image defects.

DESCRIPTION OF RELATED ART

U.S. Pat. No. 5,651,813 discloses typical ink jet pigmented ink. However, there are problems associated with using this ink in that the pigment tends to remain on the surface of the ink jet receiver element, which causes poor drying characteristics if using a non-porous glossy receiver, and poor rub resistance if using a porous glossy receiver.

U.S. Pat. No. 6,030,438 teaches the use of swelling clays as additives for pigmented ink and the ink jet printing method to improve drying time, however, prints produced by printing these inks onto porous glossy receiver do not have rub or smudge durability.

U.S. Pat. Nos. 5,716,436, GB 2,351,292, JP 2000-290553 and JP 2001-294789 disclose the use of water-dispersible polymers in ink jet inks. When these polymers are used in pigment-containing ink jet ink, the printed images are improved in rub durability or smudge resistance. However, image defects were observed when attempted for high speed printing on porous glossy receiver.

It is thus an object of this invention to provide a pigmented ink jet ink which will allow high speed printing when printed onto a receiver, especially a porous glossy receiver to produce durable images and which will provide a defect-free image.

SUMMARY OF THE INVENTION

These and other objects are achieved in accordance with this invention, which relates to an ink jet ink composition comprising from 40.0 to 95.0% by weight of water, from 0.1 to 20.0% by weight of a pigment, from 0.01 to 10.0% by weight of a natural or synthetic smectite clay mineral, and from 0.1 to 10.0% by weight of a polymer.

The smectite ink additive used in accordance with the invention is highly effective in improving the drying time and image quality of pigmented ink jet inks onto a porous glossy receiver. The ink additive can also be used with a wide variety of inks.

DETAILED DESCRIPTION OF THE INVENTION

A wide variety of organic and inorganic pigments, alone or in combination, may be selected for use in the present invention. Colorant particles that may be used in the invention include pigments as disclosed, for example in U.S. Pat. Nos. 5,026,427; 5,086,698; 5,141,556; 5,160,370; and 5,169,436, the disclosures of which are hereby incorporated by reference. The exact choice of pigments will depend upon the specific application and performance requirements such as color reproduction and image stability. Pigments suitable for use in the present invention include, for example, azo pigments, monoazo pigments, disazo pigments, azo pigment lakes, β-naphthol pigments, naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Typical examples of pigments which may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Violet 1, 2, 3, 5:1, 13, 19, 23, 25, 27, 29, 31, 32, 37, 39, 42, 44, 50; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66; C.I. Pigment Green 1, 2, 4, 7, 8, 10, 36, 45; C.I. Pigment Black 1, 7, 20, 31, 32, and C.I. Pigment Brown 1, 5, 22, 23, 25, 38, 41, 42. In a preferred embodiment of the invention, the pigment set is cyan pigment, C.I. Pigment Blue 15:3; quinacridone magenta, C.I. Pigment Red 122; C.I. Pigment Yellow 155; C.I. Pigment Yellow 74; and carbon black, C.I. Pigment Black 7.

In a preferred embodiment of this invention, the pigment has at least 50% by weight of the pigment particles equal or smaller than 150 nm, more preferred pigment has at least 50% by weight of the pigment particles equal or smaller than 100 nm, even more preferred pigment has at least 50% by weight of the pigment particles equal or smaller than 50 nm. In a most preferred embodiment of this invention said pigment has at least 90% by weight of the pigment particles equal or smaller than 100 nm.

In the case of organic pigments, the ink may contain up to approximately 20% pigment by weight, but will generally be in the range of 0.2 to 15% by weight, preferably from 0.5 to 10% by weight of the total ink composition for most ink jet printing applications. If an inorganic pigment is selected, the ink will tend to contain higher weight percentages of pigment than with comparable inks employing organic pigments, and may be as high as approximately 75% in some cases, since inorganic pigments generally have higher specific gravities than organic pigments.

The aqueous carrier medium is water or a mixture of water and at least one water miscible co-solvent or humectant. Selection of a suitable mixture depends on requirements of the specific application, such as desired surface tension and viscosity, the selected pigment, drying time of the pigmented ink jet ink, and the type of paper onto which the ink will be printed. Representative examples of humectants that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, tetraethylene glycol, propylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, diethylene glycol mono-butyl (or -ethyl) ether, propylene glycol mono-methyl (or -ethyl) ether, poly(ethylene glycol) butyl ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide, 2,2'-thiodiethanol, and tetramethylene sulfone. In a preferred embodiment of this invention, said humectant is a polyhydric alcohol. The amount of humectant employed is in the range of approximately 1 to 50 weight %, preferably approximately 5 to 40 weight %, based on the total weight of the ink.

Whenever used in the specification the terms set forth shall have the following meaning:

"Swellable" shall be used to describe layered materials which are completely intercalated with no degree of exfoliation, totally exfoliated materials with no degree of intercalation, as well as layered materials which are both intercalated and exfoliated including disordered layered materials.

"Intercalation" shall mean the insertion of one or more foreign molecules or parts of foreign molecules between platelets of the layered material, usually detected by X-ray diffraction technique, as illustrated in U.S. Pat. No. 5,891,611 (line 10, col.5—line 23, col. 7).

"Exfoliation" or "delamination" shall mean separation of individual platelets in to a disordered structure, without any stacking order.

Smectite clay mineral is a classification of layered materials or phyllosilicates in the bentonite rock group. Smectite clay minerals are swellable. They may undergo any degree of intercalation or exfoliation to give the desired results of this invention.

The most suitable smectites for this invention are plate-like with high aspect ratios. Smectites are categorized into two subgroups based on their octahedral sheet types. The dioctahedral smectite minerals belong to the montmorillonite subgroup. The trioctahedral smectite minerals belong to the saponite subgroup. The montmorillonite subgroup comprises montmorillonite, nontronite, or beidellite. The saponite subgroup comprises hectorite, saponite, or sauconite.

The aforementioned smectites may be natural or synthetic. This distinction may influence the particle size and/or the level of associated impurities. Typically, synthetic layered materials are smaller in lateral dimension, and therefore possess smaller aspect ratio. However, synthetic layered materials are purer and are of narrower size distribution, compared to natural clays and may not require any further purification or separation. For this invention, the clay particles should have dimensions of 0.2-3.0 nm by 10-150 nm. Preferred dimensions of clay particles are 0.2-2.0 nm by 10-125 nm. The resulting aspect ratio or the ratio of the largest to smallest dimensions of the layered material is 10-150. The aforementioned limits regarding the size and shape of the particles are to ensure adequate improvements in some properties of the inks without deleteriously affecting others. For example, a large lateral dimension may result in an increase in the aspect ratio, a desirable criterion for improvement in image quality. However, very large particles may cause optical defects, such as haze, and may be block the orifices of the printing apparatus.

In a preferred embodiment of the invention, laponite is used. In another preferred embodiment, the laponite is Laponite® RDS (Southern Clay Products) which has the following formula:

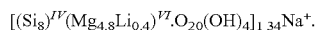

$[(Si_8)^{IV}(Mg_{4.8}Li_{0.4})^{VI}.O_{20}(OH)_4]_{1.34}Na^+$.

Laponite is a synthetic low-charge clay that closely resembles both the structure and chemical composition of natural smectite clay mineral, hectorite. This type of clay is a trioctahedral analogue of magnesium aluminum silicate montmorillonite, but contains significant amount of octahedral Li-for-Mg substitution. Other acidic species can adsorb on the basal surfaces and in the interlamellar spaces. However, unlike the natural mineral, laponite is very pure and low in metal and other impurities. The primary particles of laponite are discs in shape with approximately 30 nm in diameter and 1 nm in thickness.

In another preferred embodiment of the invention, cloisite is a preferred natural montmorillonite clay in the smectite clay mineral group. Most preferably, sodium cloisite, specifically NaCloisite® or Nanoclay, is used.

As noted above, the ink jet ink composition of the invention contains the natural or synthetic smectite clay mineral at a concentration of about 0.01 to about 10.0 weight percent. The natural or synthetic smectite clay mineral is present at a preferred concentration from 0.02 to 5.0% by weight and a more preferred concentration from 0.05 to 3.0% by weight of said ink jet ink composition.

The polymers employed in the invention in general are water-soluble, water reducible or water dispersible. A polymer of this invention may function as a binder, a dispersant, or a polymer-pigment composite. These polymers may belong to three classes: water-reducible addition polymers, polyurethanes, or polyester ionomers.

Water-reducible polymers refer to polymers having hydrophilic groups, and are not water-soluble until hydrophilic groups are ionized by the addition of base. Most commonly used hydrophilic groups are carboxylic acid, although others such as sulfonic acid, phosphoric acid and the likes can also be incorporated in the polymer. The base used to neutralize the polymer can be inorganic base, such as sodium hydroxide, potassium hydroxide or lithium hydroxide, or organic amine, such as 2-(dimethyl-amino)ethanol, triethylamine, tripropylamine, 2-amino-methyl-1-propanol, and N-ethylmorpholine. The amount of base used can from 30 to 105 mole % based on the acid groups in polymer, depending on the desirable viscosity, jettability through printhead and print durability and other properties delivered by the ink of this invention. A preferred level of 75 to 100% of the acid groups on the polymer are neutralized by alkaline metal hydroxide.

The water-dispersible addition polymers used in this invention are generally hydrophobic polymers of any composition that can be stabilized in a water-based medium.

A first class of preferred polymers includes those addition polymers prepared by free-radical polymerization of vinyl monomers selected from the group consisting of allyl compounds, allyl esters, vinyl ethers, vinyl esters, vinyl heterocyclic compounds, styrene or a styrene derivative, olefins and halogenated olefins, itconic acid and esters, crotonic acid and esters, unsaturated nitriles, acrylic acid or methacrylic acid and esters, vinyl alcohols, acrylamides and methacrylamides, vinyl ketones, and multifunctional monomers. Further preference is given to addition polymers of monomers selected from the group consisting of vinyl ethers, styrene and styrene derivatives, olefins and halogenated olefins, itconic acid and esters and acrylic acid and methacrylic acid and esters.

Suitable monomers for addition polymers are well known in the art, methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, t-butyl styrene, vinyl toluene, butadiene, isoprene, N,N-dimethyl acrylamide, acrylic acid, methacrylic acid, chloromethacrylic acid, maleic acid, allylamine, N,N-diethylallylamine, vinyl sulfonamide, sodium acrylate, sodium methacrylate, ammonium acrylate, ammonium methacrylate, acrylamidopropane-triethylammonium chloride, methacrylamidopropane-triethylammonium chloride, vinyl-pyridine hydrochloride, sodium vinyl phosphonate and sodium 1-methylvinylphosphonate, sodium vinyl sulfonate, sodium 1-methylvinyl-sulfonate, sodium 2-acrylamido-2-methyl-1-propanesulfonate or sodium styrenesulfonate, and mixture of various combinations of these monomers.

In a preferred embodiment of the invention, the monomer for the addition polymer is an ester of acrylic acid, an ester of methacrylic acid, styrene or a styrene derivative. In another preferred embodiment of this invention, the addition polymer has a Tg of −40 to 200 degrees C., preferably 20 to 180 degrees C. In yet another preferred embodiment of this invention, the weight average molecular weight of the addition polymer is from 2,000 to 100,000, preferably 4,000 to 40,000; the acid number is from 50 to 400, preferably 100 to 300; Acid number is determined by titration and it is defined as mg of KOH required to neutralize 1 g of polymer solids.

A second class of polymers which may be used in the invention include aqueous dispersible polyester ionomers. In a preferred embodiment, the polyester ionomers have the following general formula:

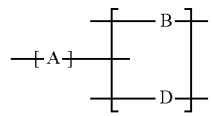

wherein:

A is the residue of one or more diol components which together comprise 100 mole % of recurring units and is represented by the following structure:

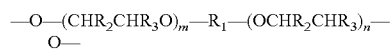

—O—(CHR$_2$CHR$_3$O)$_m$—R$_1$—(OCHR$_2$CHR$_3$)$_n$—
O— wherein:

m and n independently represent an integer from 0-4; R$_1$ represents S, an alkylene group of 1 to about 16 carbon atoms; a cycloalkylene group of 5 to about 20 carbon atoms; a cyclobisalkylene group of about 8 to about 20 carbon atoms, a bi- or tri-cycloalkylene group of about 7 to about 16 carbon atoms, a bi- or tri-cyclobisalkylene group of about 9 to about 18 carbon atoms, an arenebisalkylene group of from 8 to about 20 carbon atoms or an arylene group of 6 to about 12 carbon atoms, a carbinol-terminated polydimethylsiloxane segment; and $R_2$ and $R_3$ each independently represents H, a substituted or unsubstituted alkyl group of about 1 to about 6 carbon atoms or a substituted or unsubstituted aryl group of about 6 to about 12 carbon atoms; B is the residue of a diacid component which comprises 8 to 50 mole % of recurring units and is represented by one or more of the following structures:

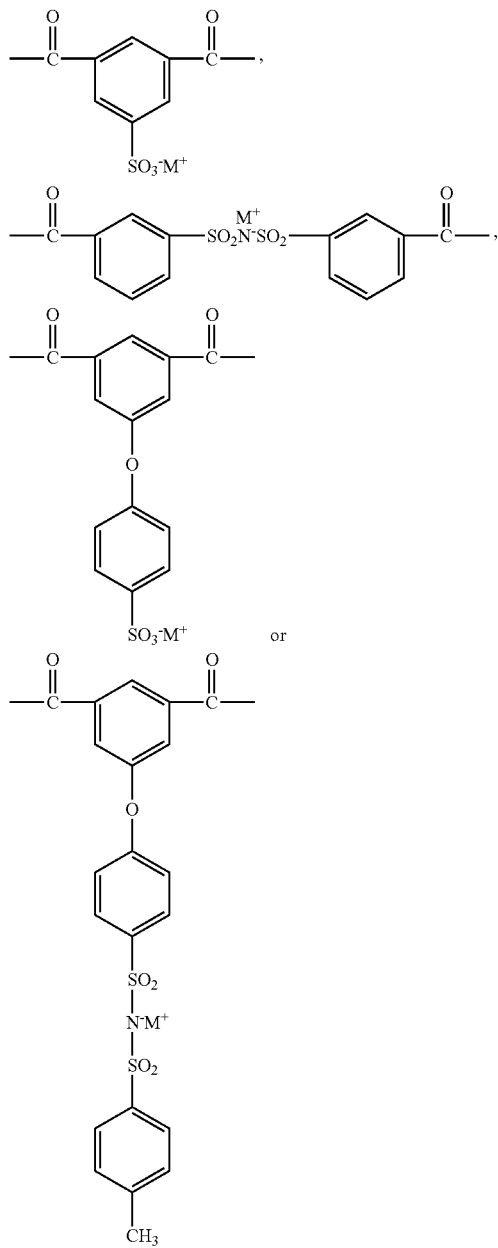

etc.; and D is the residue of a diacid component which comprises 50 to 92 mole % of recurring units and is represented by one or more of the following structures:

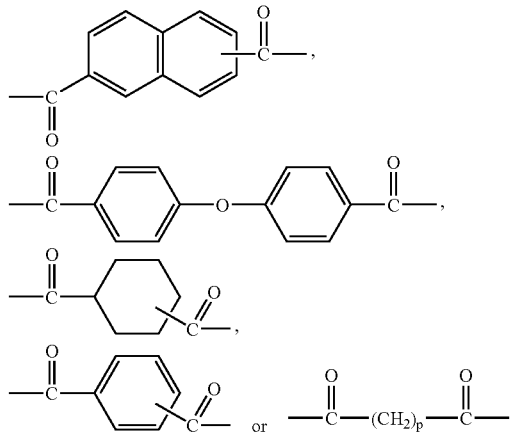

wherein p represents an integer from 2 to 12.

Some typical diols which A in the above formula represents include ethylene glycol, diethylene glycol, triethylene glycol, thiodiethanol, cyclohexanedimethanol, bisphenol A, trans-1, 4-cyclohexanediol, dodecanediol, cis-exo-2,3-norbornanediol, 5-norbornene-2,2-dimethanol, hydroquinone bis (2-hydroxyethylether), carbinol terminated polydimethylsiloxane, MW=1000 (DMS-C15), (Gelest Inc.), etc.

Specific examples of water-dispersible polyesters useful in the invention include Eastman AQ® polyesters, (Eastman Chemical Company). Eastman Polyesters AQ 29, AQ 38, and AQ 55 are composed of varying amounts of isophthalic acid, sodium sulfoisophthalic acid, diethylene glycol, and 1,4-cyclohexanedimethanol. These thermoplastic, amorphous, ionic polyesters are prepared by a melt-phase condensation polymerization at high temperature and low pressure, and the molten product is extruded into small pellets. The solid polymer disperses readily in water at 70° C. with minimal agitation to give translucent, low viscosity dispersions containing no added surfactants or solvents. Varying the amount of ionic monomers, i.e., sulfoisophthalic acid, can control the particle size. The particle sizes range from 0.02 to 0.1 μm.

A third class of polymers which may be used in the invention include aqueous dispersible polyurethanes. In a preferred embodiment, the polyurethanes have the following general formula:

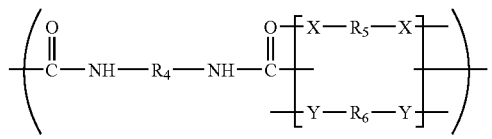

wherein $R_4$ is the central portion of the monomer unit that is the polymerization product of a diisocyante, and is preferably a hydrocarbon group having a valance of two, more preferably containing a substituted or unsubstituted alicyclic, aliphatic, or aromatic group, preferably represented by one or more of the following structures:

wherein:

$M^+$ represents alkali metals, such as Li, Na and K; ammonium groups such as ammonium, methylammonium, triethylammonium, tetralkylammonium, aryltrialkylammonium, etc.; phosphonium groups such as triphenylphosphonium; tetrabutylphosphonium; heteroaromatic ammonium groups such as pyridinium, imidazolium and N-methylammonium; sulfonium groups; guanidinium groups; amidinium groups,

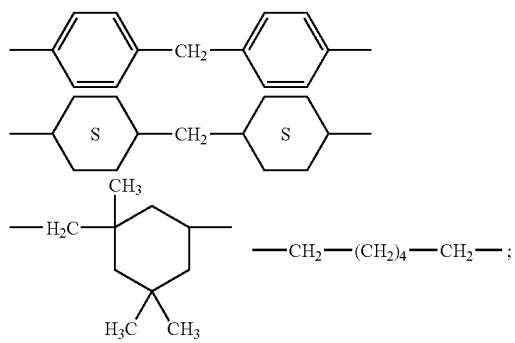

$R_5$ represents the central portion of a monomeric unit that is the polymerization product of a diamine, diol or polyol; and X and Y can be the same or different and are —O- or —N-atom.

Suitable well known diamine chain extenders useful herein include ethylene diamine, diethylene triamine, propylene diamine, butylene diamine, hexamethylene diamine, cyclohexylene diamine, phenylene diamine, tolylene diamine, xylylene diamine, 3,3'-dinitrobenzidene, ethylene methylenebis(2-chloroaniline), 3,3'-dichloro-4,4'-biphenyl diamine. 2,6-diaminopyridine, 4,4'-diamino diphenylmethane, adducts of diethylene triamine with acrylate or its hydrolyzed products, hydrazine, and substituted hydrazines. Suitable well known diol chain extenders useful herein include glycols such as ethylene glycol, propylene-1,2-glycol, propylene-1,3-glycol, diethylene glycol, butane-1,4-diol, hexane-1,6-diol, octane-1,8-diol, neopentyl glycol, 2-methyl propane-1,3-diol, or the various isomeric bis-hydroxymethylcyclohexanes.

Suitable well known polyol chain extenders useful herein include a) a dihydroxy polyester obtained by esterification of a dicarboxylic acid such as succinic acid, adipic acid, suberic acid, azelaic acid, sebacic acid, phthalic, isophthalic, terephthalic, tetrahydrophthalic acid, and the like; b) a polylactone such as polymers of ε-caprolactone and one of the above mentioned diols; and c) a polycarbonate obtained, for example, by reacting one of the above-mentioned diols with diaryl carbonates or phosgene. One or more diamine or diol chain extender can be used.

$R_6$ is the central portion of a monomeric unit containing a phosphoric acid, carboxylic acid or sulfonic acid group, preferably being carboxylic acids, such as 2,2'-bis(hydroxymethyl)propionic acid and hydroxyethylether of 4,4'-bis(4-hydroxyphenyl)valeric acid. The amount of acid monomer used in polymerization, based on the total weight of the polymer preferred to be at least 4 percent, more preferably 5 to 40 percent. The acid is converted into its salt by using organic amine or inorganic base, aqueous hydroxides, potassium, sodium, lithium, and ammonium ions are preferred. These materials may be prepared as described in U.S. Pat. No. 4,335,029 Dadi, et al. assignee Witco Chemical Corporation (New York, N.Y.) and in Aqueous Polyurethane Dispersions B. K. Kim, Colloid & Polymer Science, Vol. 274, No. 7 (1996) 599-611© Steinopff Verlag 1996. Furthermore, the polyurethane suitable for this invention has a Tg of –40 to 200 degrees C., preferably 20 to 180 degrees C., and an weight average molecular weight of 2,000 to 200,000, preferably 4,000 to 100,000, wherein the polymer has a calculated acid number of 20 to 200, preferably 20 to 160.

The polymer used in the invention is present in the ink jet ink generally from about 0.1% to about 20% by weight, preferably from about 0.1% to about 10% by weight based on the total weight of the ink. In general, it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to the desired concentration. A preferred method for making the inks of the invention is disclosed in U.S. Pat. Nos. 5,679,138, 5,670,139, 6,152,999 and 6,210,474, the disclosure of which is hereby incorporated by reference. By dilution, the ink is adjusted to the desired viscosity, color, hue, saturation density and print area coverage for the particular application.

Pigment dispersions prepared by other methods well known in the art, such as surface modified pigments disclosed in U.S. Pat. Nos. 5,837,045 and 5,922,118, and E.P. Patent 1,134,261 A1 are also suitable for this invention. Jet velocity, separation length of the droplets, drop size and stream stability are greatly affected by the surface tension and the viscosity of the ink. Pigmented ink jet inks suitable for use with ink jet printing systems should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

Acceptable viscosities are no greater than 20 centipoise, and preferably in the range of about 1.0 to about 12.0 centipoise, more preferably from about 1.0 to about 8.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

A penetrant (0-10 wt. %) may also be added to the ink composition of the invention to help the ink penetrate the receiving substrate, especially when the substrate is a highly sized paper. A preferred penetrant for the inks of the present invention is n-propanol at a final concentration of 1-6 wt. %.

A biocide (0.01-1.0 wt. %) may also be added to prevent unwanted microbial growth that may occur in the ink over time. A preferred biocide for the inks of the present invention is Proxel® GXL (Zeneca Colours Co.) at a concentration of 0.05-0.5 wt. %. Additional additives that may optionally be present in ink jet inks include thickeners, conductivity enhancing agents, anti-kogation agents, drying agents, and defoamers.

The ink receptive substrates often comprise a support and at least one ink ink-receiving layer. The support for the ink-receiving element employed in the invention can be paper or resin-coated paper, plastics such as a polyolefin type resin or a polyester-type resin such as poly(ethylene terephthalate), polycarbonate resins, polysulfone resins, methacrylic resins, cellophane, acetate plastics, cellulose diacetate, cellulose triacetate, vinyl chloride resins, poly(ethylene naphthalate), polyester diacetate, various glass materials, etc. or comprising an open pore structure such as those made from polyolefins or polyesters. The thickness of the support employed in the invention can be, for example, from about 12 to about 500 μm, preferably from about 75 to about 300 μm.

In a preferred embodiment of the invention, the continuous, coextensive, porous ink-receiving layer contains organic or inorganic particles. Examples of organic particles which may be used include core/shell particles such as those disclosed in U.S. Ser. No. 09/609/969 of Kapusniak et al., filed Jun. 30, 2000, and homogeneous particles such as those disclosed in U.S. Ser. No. 09/608/466 of Kapusniak et al., filed Jun. 30, 2000, the disclosures of which are hereby incorporated by reference. Examples of organic particles that may be used include acrylic resins, styrenic resins, cellulose derivatives, polyvinyl resins, ethylene-allyl copolymers and polycondensation polymers such as polyesters. Examples of inorganic particles that may be used in the invention include silica, alumina, titanium dioxide, clay, calcium carbonate, barium sulfate, or zinc oxide.

In a preferred embodiment of the invention, the porous ink-receiving layer comprises from about 20% to about 100% of particles and from about 0% to about 80% of a polymeric binder, preferably from about 80% to about 95% of particles and from about 20% to about 5% of a polymeric binder. The polymeric binder may be a hydrophilic polymer such as poly(vinyl alcohol), poly(vinyl pyrrolidone), gelatin, cellulose ethers, poly(oxazolines), poly(vinylacetamides), partially hydrolyzed poly(vinyl acetate/vinyl alcohol), poly(acrylic acid), poly(acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan and the like. Preferably, the hydrophilic polymer is poly(vinyl alcohol), hydroxypropyl cellulose, hydroxypropyl methyl cellulose, a poly(alkylene oxide), poly(vinyl pyrrolidinone), poly(vinyl acetate) or copolymers thereof or gelatin.

In order to impart mechanical durability to an ink jet recording element, crosslinkers that act upon the binder discussed above may be added in small quantities. Such an additive improves the cohesive strength of the layer. Crosslinkers such as carbodiimides, polyfunctional aziridines, aldehydes, isocyanates, epoxides, polyvalent metal cations, vinyl sulfones, pyridinium, pyridylium dication ether, methoxyalkyl melamines, triazines, dioxane derivatives, chrom alum, zirconium sulfate and the like may be used. Preferably, the crosslinker is an aldehyde, an acetal or a ketal, such as 2,3-dihydroxy-1,4-dioxane.

As used herein, a porous ink jet receiving layer is one that is usually composed of inorganic or organic particles bonded together by a binder. The amount of particles in this type of coating is often far above the critical particle volume concentration, which results in high porosity in the coating. During the ink jet printing process, ink droplets are rapidly absorbed into the coating through capillary action and the image is dry-to-touch right after it comes out of the printer. Therefore, porous coatings allow fast "drying" of the ink and produce a smear-resistant image.

The porous ink-receiving layer can also comprise an open-pore polyolefin, an open-pore polyester or an open pore membrane. An open pore membrane can be formed in accordance with the known technique of phase inversion. Examples of porous ink-receiving layer comprising an open-pore membrane are disclosed in U.S. Ser. No. 09/626/752 and U.S. Ser. No. 09/626/883, both of Landry-Coltrain et al., filed Jul. 27, 2000.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance with digital data signals. An ink droplet is not generated and ejected through the orifices of the print head unless it is needed.

The following examples illustrate the utility of the present invention.

EXAMPLES

Preparation of Pigment Dispersions

| Magenta Pigment Dispersion 1 (MD-1) | |
|---|---|
| Polymeric beads, mean diameter of 50 μm (milling media) | 325.0 g |
| Quinacridone magenta (pigment red 122) from Sun Chemical Co. | 30 g |
| Oleoyl methyl taurine, (OMT) sodium salt | 9.0 g |
| Deionized water | 210.8 g |
| Proxel GXL ® (biocide from Zeneca) | 0.2 g |

The above components were milled in a 2 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the mixture through a 4-8 μm KIMAXR® Buchner Funnel obtained from VWR Scientific Products.

Magenta Pigment Dispersion 2 (MD-2)

A self-dispersed pigment red 122 dispersion prepared by surface modification technology through diazonium reaction was obtained from Cabot Corporation. The sample identification by Cabot was IJX-266™, at 10.2% solids.

Yellow Pigment Dispersion 1 (YD-1)

This dispersion was prepared the same as the magenta pigment dispersion except that Pigment Yellow 155 (Clariant Corp.) was used instead of the magenta pigment.

Yellow Pigment Dispersion 2 (YD-2)

A self-dispersed pigment yellow 74 dispersion prepared by surface modification technology through diazonium reaction was obtained from Cabot Corporation. The sample identification by Cabot was IJX-273™, at 9.7% solids.

Preparation of Polymers

P-1

P-1 was prepared by mixing 320 grams of solid Jonrez IJ-4655™ (a addition polymer obtained from Westvaco Corporation, having acid number of 230, Tg of 80C and number average molecular weight of 5,600, quoted from Westvaco.) with 260.8 grams of water and 699.2 grams of 10% KOH solution until the polymer was completely dissolved. The concentration of active polymer was 25% by weight. 95% of acid on polymer was neutralized by KOH.

P-2

P-2 was prepared by mixing 40 grams of Jonrez IJ-4655™ (a addition polymer obtained from Westvaco Corporation) with 106.1 grams of water and 13.9 grams of N,N-dimethylethanol amine until the polymer was completely dissolved. The concentration of active polymer is 25% by weight. 95% of acid on polymer was neutralized by N,N-dimethylethanol amine.

P-3

P-3 was IJ-4680™ available from Westvaco Corporation, supplied in solution form of 26% solids. It is a addition polymer having acid number of 170 and Tg of 50C. Organic amine was used as the base to solubilize the polymer.

P-4

P-4 was prepared by mixing 1000 grams of IJ-4680™ solution (available from Westvaco Corporation) with 400 gram of 10% KOH solution, and then followed by heating to 80C under vacuum to remove volatile organic amine. The final solution was 25.84% in solids. The amine counter ion for the acid on polymer was expected to be replaced by potassium ion after the reaction.

P-5

P-5 was Joncryl™ 70, a 30% solids addition resin solution available from Johnson Polymer. The polymer has weight average molecular weight of 16,500, acid number of 240, Tg of 102C, quoted from product literature published by Johnson Polymer.

P-6

Solid AQ-55™ polyester ionomer was purchased from Eastman Chemical, and then added to water with heat and agitation to obtain AQ-55™ dispersion at 30% solids in concentration.

P-7

In a 1-liter resin flask equipped with thermometer, stirrer, water condenser and a vacuum outlet, the following were added at 40° C. while stirring: 300.00 g tetrahydrofuran, 71.46 g (0.533 moles) dimethylol propionic acid, 14.14 g (0.133 moles) di(ethylene glycol), and 22 drops of dibutyltin dilaurate (catalyst). The temperature was adjusted to 72° C., and when a homogeneous solution was obtained, 174.76 g (0.666 moles) of 4,4'-methylenebis(cyclohexyl isocyante) was added. The temperature was maintained at 72° C. for about 16 hours to complete the reaction, resulting in an intermediate containing less than 3% free isocyanate. The free isocyanate content was monitored by infrared spectroscopy of the absorption peak at 2240 wave number.

The reaction mixture was neutralized with 29.90 g of potassium hydroxide pellets. 1400 g of distilled water was added to the neutralized mixture under high shear to form a stable aqueous solution followed by evaporation under vacuum to remove tetrahydrofuran. The final solution was 19.64% in solids. The polymer has weight average molecular weight of 31,550, calculated acid number of 115, Tg of 95C.

P-8

300 grams of polyvinyl alcohol available from Aldrich Chemical (catalogue number 36062-7, 80% hydrolyzed, weight average molecular weight of 9,000-10,000) was mixed with 700 grams of water, and heated to 85° C. with stirring for 6 hours to obtain a clear solution of 30% in solids.

Polymer Characterization

Glass Transition Temperature

Glass transition temperature (Tg) of the dry polymer material was determined by differential scanning calorimetry (DSC), using a heating rate of 20° C./minute. Tg is defined herein as the inflection point of the glass transition.

Weight average Molecular Weight:

The samples were analyzed by size-exclusion chromatography (SEC) with light-scattering detection at 15 and 90 degrees from the incident beam in 1,1,1,3,3,3-hexafluoroisopropanol (HFIP) containing 0.01M tetraethylammonium nitrate at 45° C. using two 7.5 mm×300 mm Plgel mixed-C columns. The absolute molecular weight distribution was calculated from excess Raleigh scattering assuming a random coil model. The specific refractive index increment was obtained by integration of the differential refractive index detector response. Weight average molecular weights (Mw) in HFIP at 45° C. are reported. Distributions and molecular weight averages have been corrected for axial dispersion assuming a Gaussian band-broadening function, when appropriate.

Preparation of Nanoclay Laponite RDS™ Dispersion 30 grams of Laponite RDS™ powder, available from Southern Clay Products, and 970 grams of water was stirred at 60° C. for 6 hours to obtain 3% Laponite RDS dispersion.

Preparation of Nanoclay Cloisite Na+ Dispersion 191.8 g of water and 0.2 g of Dequest™ 2006 (a penta sodium salt of amino tri(methylene-phosphonic acid), $Na_5HATMP$, obtained from Solutia Incorporated) were added to a clean vessel. 8.0 g Cloisite Na+, available from Southern Clay Products, was added together with 600 g of zirconium silicate milling media (1.25 mm diameter). The sealed container was placed on a roller mill at about 200 rpm for 40 hours at room temperature to yield a 4% Cloisite Na+ dispersion.

Ink Preparation

An ink formulation employed in this invention was prepared by mixing all ingredients with mild stirring at room temperature. An aliquot of the pigment dispersion to yield 2.2% pigment was mixed with 20.0 g diethylene glycol, 6.0 g glycerol, 0.2 g Surfynol® 465 (Air Products Inc.), 2.5 g ethylene glycol butyl ether (Dowanol™ EB) (Dow Chemical Co.), polymer to yield 2.0% where specified below, swelling clay and additional deionized water for a total of 100.0 g. The ink was filtered through a 1.5 μm glass microfibre filter, vacuum degassed and introduced into an empty ink bag.

The pigments, polymers and natural or synthetic smectite clay mineral used in the inks employed in this invention and comparison inks are given in the following Tables 1 and 2:

TABLE 1

Comparison Inks

| Ink | Pigment Dispersion | Polymer (2% in ink) | Nanoclay (wt. % in ink) |
|---|---|---|---|
| CM-1 | MD-1 | none | none |
| CM-2 | MD-1 | P-1 | none |
| CM-3 | MD-1 | P-2 | none |
| CM-4 | MD-1 | P-3 | none |
| CM-5 | MD-1 | P-4 | none |
| CM-6 | MD-1 | P-5 | none |
| CM-7 | MD-1 | P-6 | none |
| CM-8 | MD-1 | P-7 | none |
| CM-9 | MD-1 | P-8 | none |
| CM-10 | MD-1 | None | Laponite RDS ™ (0.55) |
| CM-11 | MD-2 | P-1 | None |
| CY-1 | YD-1 | none | None |
| CY-2 | YD-1 | P-1 | None |
| CY-3 | YD-1 | P-2 | None |
| CY-4 | YD-1 | P-3 | None |

TABLE 1-continued

Comparison Inks

| Ink | Pigment Dispersion | Polymer (2% in ink) | Nanoclay (wt. % in ink) |
|---|---|---|---|
| CY-5 | YD-1 | P-4 | None |
| CY-6 | YD-1 | P-5 | None |
| CY-7 | YD-1 | P-6 | None |
| CY-8 | YD-1 | P-7 | None |
| CY-9 | YD-1 | P-8 | None |
| CY-10 | YD-1 | None | Laponite RDS ™ (0.55) |
| CY-11 | YD-2 | P-1 | None |

TABLE 2

Inks of this invention

| Ink | Pigment Dispersion | Polymer (2% in ink) | Nanoclay (wt % in ink) |
|---|---|---|---|
| IM-1 | MD-1 | P-1 | Laponite ™ RDS (0.02) |
| IM-2 | MD-1 | P-1 | Laponite ™ RDS (0.22) |
| IM-3 | MD-1 | P-1 | Laponite ™ RDS (0.55) |
| IM-4 | MD-1 | P-1 | Laponite ™ RDS (0.66) |
| IM-5 | MD-1 | P-2 | Laponite ™ RDS (0.55) |
| IM-6 | MD-1 | P-3 | Laponite ™ RDS (0.55) |
| IM-7 | MD-1 | P-4 | Laponite ™ RDS (0.55) |
| IM-8 | MD-1 | P-5 | Laponite ™ RDS (0.55) |
| IM-9 | MD-1 | P-6 | Laponite ™ RDS (0.55) |
| IM-10 | MD-1 | P-7 | Laponite ™ RDS (0.55) |
| IM-11 | MD-1 | P-8 | Laponite ™ RDS (0.55) |
| IM-12 | MD-2 | P-1 | Laponite ™ RDS (0.55) |
| IM-13 | MD-1 | P-1 | Cloisite Na+ (0.55) |
| IY-1 | YD-1 | P-1 | Laponite ™ RDS (0.02) |
| IY-2 | YD-1 | P-1 | Laponite ™ RDS (0.22) |
| IY-3 | YD-1 | P-1 | Laponite ™ RDS (0.55) |
| IY-4 | YD-1 | P-1 | Laponite ™ RDS (0.66) |
| IY-5 | YD-1 | P-2 | Laponite ™ RDS (0.55) |
| IY-6 | YD-1 | P-3 | Laponite ™ RDS (0.55) |
| IY-7 | YD-1 | P-4 | Laponite ™ RDS (0.55) |
| IY-8 | YD-1 | P-5 | Laponite ™ RDS (0.55) |
| IY-9 | YD-1 | P-6 | Laponite ™ RDS (0.55) |
| IY-10 | YD-1 | P-7 | Laponite ™ RDS (0.55) |
| IY-11 | YD-1 | P-8 | Laponite ™ RDS (0.55) |
| IY-12 | YD-2 | P-1 | Laponite ™ RDS (0.55) |
| IY-13 | YD-1 | P-1 | Cloisite Na+ (0.55) |

Ink Jet Recording Media

Ink jet recording media 1 (IRL-1) was a 2-layer porous glossy ink jet media on a polyethylene-coated paper was prepared. The bottom layer consisted of fumed alumina, Cab-O-Sperse PG003®, (Cabot Corp.), polyvinyl alcohol, GH-23, (Nippon Ghosei) and 2,3-dihydroxy-1,4-dioxane (Clariant Corp.) at a weight ratio of 87:9:4 and a thickness of 38 µm. The top layer consisted of fumed alumina, Cab-O-Sperse PG003, (Cabot Corp.), polyvinyl alcohol, GH-23, (Nippon Ghosei), surfactant Zonyl FSN® (DuPont Corp.) and dye mordanting material MM at a weight ratio of 69:6:5:20 and a thickness of 2 µm. MM was a crosslinked hydrogel polymer particle of 80 nm in average particle size prepared from 87% by weight of N-vinylbenzyl-N,N,N-trimethylammonium chloride and 13% by weight of divinylbenzene.

Ink jet recording media 2 (IRL-2) was Mitsubishi IJ-RC-UF 120™ (from Mitsubishi Corporation), which is a porous, glossy receiver.

Ink jet recording media 3 (IRL-3) was a two-layer coating on plain paper prepared as follows. The coating solution for the base layer was prepared by mixing 254 dry g of precipitated calcium carbonate Albagloss-s® (Specialty Minerals Inc.) as a 70% solution, 22 dry g of silica gel Gasil® 23F (Crosfield Ltd.), 2.6 dry g of poly(vinyl alcohol) Airvol® 125 (Air Products) as a 10% solution, 21 dry g of styrene-butadiene latex CP692NA® (Dow Chemicals) as a 50% solution and 0.8 g of Alcogum® L-229 (Alco Chemicals). The concentration of the coating solution was adjusted to 35 wt. % by adding water. The coating solution was bead-coated at 25° C. on a plain paper support with basis weight of 185 g/m² (Eastman Kodak Co.) and dried by forced air at 45° C. The thickness of the base layer was 25 µm or 27 g/m².

The coating solution for the top layer was prepared by mixing 15.0 dry g of alumina Dispal® 14N4-80 (Condea Vista) as 20 wt. % solution, 2.4 dry g of fumed alumina Cab-O-Sperse® PG003 (Cabot Corp.) as a 40 wt. % solution, 0.6 dry g of poly(vinyl alcohol) Gohsenol® GH-17 (Nippon Gohsei Co. Ltd.) as a 10 wt. % solution, 1.2 dry g of a copolymer of (vinylbenzyl)trimethylammonium chloride and divinylbenzene (87:13 molar ratio) as a 20 wt. % solution, 1.2 dry g of a terpolymer of styrene, (vinylbenzyl)dimethylbenzylamine and divinylbenzene (49.5:49.5:1.0 molar ratio) as a 20 wt. % solution, 0.9 dry g of Encapsulated Particles 1 as a 40 wt. % solution, 0.1 g of Silwet® L-7602 (Witco. Corp.), 0.2 g of Zonyl® FS300 (DuPont Co.) and water to total 153 g. The preparation of Encapsulated Particles 1 is disclosed in Example 1 of U.S. Ser. No. 09/944,547, of Sadasivan et al. filed Aug. 31, 2001 (Docket 82380), the disclosure of which is hereby incorporated by reference. The coating solution was bead-coated at 25° C. on top of the base layer described above. The recording element was then dried by forced air at 45° C. for 80 seconds followed by 38° C. for 8 minutes. The thickness of the image-receiving layer was 8 µm or 8.6 g/m².

Printing

Two digital images were designed and printed on a Kodak Professional 3043™ large format printer (720 dots per inch, 22 pl drop volume) on ink jet recording media listed above.

Image 1, requiring the use of only one magenta ink, consisted of strips of D-max (magenta), where D-max refers to 100% ink coverage. Image 2, requiring the use of one magenta ink and one yellow ink, consisted of 10 squares each 1 cm by 2 cm wherein equal amounts of magenta and yellow inks were printed in each square, and the total ink laydown decreased from 200% (100% of magenta ink and 100% yellow ink) to 20% (10% magenta ink and 10% yellow ink) from the first to the last squares.

Dry time and coalescence behavior were assessed using the appropriate image as described below and are presented in the appropriate tables that follow.

Dry Time

Immediately following printing image 1, each magenta strip was rubbed three times with moderate pressure by a gloved finger. This was done at intervals to determine the time to achieve dry durability of the ink on the receiver. Time zero was defined as the immediate testing of the last printed area of the image. The image was then visually assessed to determine the total time passed before no ink was removed by a rub sequence. The results of the visual assessment represent "dry time" in minutes in tables to follow, shorter dry time is more desirable.

Coalescence

Image 2 was printed on various ink jet receivers to assess coalescence. Image 2 consisted of 10 squares each 1 cm by 2 cm wherein equal amounts of magenta and yellow inks were printed in each square. Each subsequent square decreased in ink coverage by 20% (10% magenta ink, 10% yellow ink).

The printed image was visually assessed under 2.25× magnification to determine the maximum ink coverage that could be achieved without the apparent defect of coalescence or density fluctuations. The results of this evaluation represent "coalescence", where a value may range from 0 to 200, with 200 representing the best case scenario where no coalescence was observed in the area where 200% of inks were laid down.

Experiment 1

This experiment compared the effects of the addition of polymer or clay to the ink on the dry time and coalescence of the printed images. This experiment also compared the effects of the varying levels of smectite clay on the dry time and coalescence of the printed images.

Images 1 and 2 were printed on IRL-1, IRL-2, and IRL-3 using comparison inks and inks of this invention. The results of dry time and coalescence assessments, tabulated in Tables 3, 4 & 5, indicate that a polymer is necessary to achieve a favorable dry time result. However, the polymer has a negative impact on the occurrence of coalescence. The use of smectite clay mineral in the absence of polymer has little to no effect on the dry time or the coalescence behavior of the inks on the ink jet receivers. The use of Laponite RDS™ dispersion at increasing levels in ink formulations shows that, in the presence of polymer, dry time is maintained while the coalescence rating is improved.

TABLE 3

| Inks | Ink jet recording media | Note | Polymer in each ink | Nanoclay in each ink (wt % in ink) | Dry Time (minutes) | Coalescence |
|---|---|---|---|---|---|---|
| CM-1, CY-1 | IRL-1 | Comparison | none | none | >1000 | 160 |
| CM-2, CY-2 | IRL-1 | Comparison | P-1 | none | 1 | 80 |
| CM-10, CY-10 | IRL-1 | Comparison | none | Laponite RDS ™ (0.55) | >1000 | 160 |
| IM-1, IY-1 | IRL-1 | Invention | P-1 | Laponite RDS ™ (0.02) | 0 | 80 |
| IM-2, IY-2 | IRL-1 | Invention | P-1 | Laponite RDS ™ (0.22) | 0 | 100 |
| IM-3, IY-3 | IRL-1 | Invention | P-1 | Laponite RDS ™ (0.55) | 0 | 120 |
| IM-4, IY-4 | IRL-1 | Invention | P-1 | Laponite RDS ™ (0.66) | 0 | 120 |

TABLE 4

| Inks | Ink jet recording media | Note | Polymer in each ink | Nanoclay in each ink (wt % in ink) | Dry Time (minutes) | Coalescence |
|---|---|---|---|---|---|---|
| CM-1, CY-1 | IRL-2 | Comparison | none | none | >1000 | 180 |
| CM-2, CY-2 | IRL-2 | Comparison | P-1 | none | 0 | 180 |
| CM-10, CY-10 | IRL-2 | Comparison | none | Laponite RDS ™ (0.55) | >1000 | 200 |
| IM-1, IY-1 | IRL-2 | Invention | P-1 | Laponite RDS ™ (0.02) | 0 | 200 |
| IM-2, IY-2 | IRL-2 | Invention | P-1 | Laponite RDS ™ (0.22) | 0 | 200 |
| IM-3, IY-3 | IRL-2 | Invention | P-1 | Laponite RDS ™ (0.55) | 0 | 200 |
| IM-4, IY-4 | IRL-2 | Invention | P-1 | Laponite RDS ™ (0.66) | 0 | 200 |

TABLE 5

| Inks | Ink jet recording media | Note | Polymer in each ink | Nanoclay in each ink (wt % in ink) | Dry Time (minutes) | Coalescence |
|---|---|---|---|---|---|---|
| CM-1, CY-1 | IRL-3 | Comparison | none | none | >1000 | 100 |
| CM-2, CY-2 | IRL-3 | Comparison | P-1 | none | 1 | 80 |
| CM-10, CY-10 | IRL-3 | Comparison | none | Laponite RDS ™ (0.55) | >1000 | 100 |
| IM-1, IY-1 | IRL-3 | Invention | P-1 | Laponite RDS ™ (0.02) | 1 | 80 |
| IM-2, IY-2 | IRL-3 | Invention | P-1 | Laponite RDS ™ (0.22) | 1 | 100 |

TABLE 5-continued

| Inks | Ink jet recording media | Note | Polymer in each ink | Nanoclay in each ink (wt % in ink) | Dry Time (minutes) | Coalescence |
|---|---|---|---|---|---|---|
| IM-3, IY-3 | IRL-3 | Invention | P-1 | Laponite RDS ™ (055) | 1 | 120 |
| IM-4, IY-4 | IRL-3 | Invention | P-1 | Laponite RDS ™ (0.66) | 0 | 120 |

Experiment 2

Experiment 2 compared dry time and coalescence effects of different classes of polymers used in conjunction with smectite clays in inks. Images 1 and 2 were printed on IRL-1, IRL-2 and IRL-3. The results of dry time and coalescence assessments are tabulated in Tables 6, 7 & 8 below.

TABLE 6

| Inks | Ink jet recording media | Note | Polymer | Nanoclay (wt % in ink) | Dry Time, min | Coalescence |
|---|---|---|---|---|---|---|
| CM-2, CY-2 | IRL-1 | Comparison | P-1 | none | 1 | 80 |
| IM-3, IY-3 | IRL-1 | Invention | P-1 | Laponite RDS ™ (0.55) | 0 | 120 |
| CM-3, CY-3 | IRL-1 | Comparison | P-2 | none | 0 | 80 |
| IM-5, IY-5 | IRL-1 | Invention | P-2 | Laponite RDS ™ (0.55) | 0 | 120 |
| CM-4, CY-4 | IRL-1 | Comparison | P-3 | none | 0 | 120 |
| IM-6, IY-6 | IRL-1 | Invention | P-3 | Laponite RDS ™ (0.55) | 0 | 160 |
| CM-5, CY-5 | IRL-1 | Comparison | P-4 | none | 0 | 120 |
| IM-7, IY-7 | IRL-1 | Invention | P-4 | Laponite RDS ™ (0.55) | 0 | 160 |
| CM-6, CY-6 | IRL-1 | Comparison | P-5 | none | 0 | 100 |
| IM-8, IY-8 | IRL-1 | Invention | P-5 | Laponite RDS ™ (0.55) | 0 | 160 |
| CM-7, CY-7 | IRL-1 | Comparison | P-6 | none | 0 | 120 |
| IM-9, IY-9 | IRL-1 | Invention | P-6 | Laponite RDS ™ (0.55) | 0 | 160 |
| CM-8, CY-8 | IRL-1 | Comparison | P-7 | none | 0 | 120 |
| IM-10, IY-10 | IRL-1 | Invention | P-7 | Laponite RDS ™ (0.55) | 0 | 120 |
| CM-9, CY-9 | IRL-1 | Comparison | P-8 | none | 0 | 160 |
| IM-11, IY-11 | IRL-1 | Invention | P-8 | Laponite RDS ™ (0.55) | 0 | 160 |

TABLE 7

| Inks | Ink jet recording media | Note | Polymer | Nanoclay (wt % in ink) | Dry Time, min | Coalescence |
|---|---|---|---|---|---|---|
| CM-2, CY-2 | IRL-2 | Comparison | P-1 | none | 0 | 180 |
| IM-3, IY-3 | IRL-2 | Invention | P-1 | Laponite RDS ™ (0.55) | 0 | 200 |
| CM-3, CY-3 | IRL-2 | Comparison | P-2 | none | 1 | 200 |
| IM-5, IY-5 | IRL-2 | Invention | P-2 | Laponite RDS ™ (0.55) | 0 | 200 |
| CM-4, CY-4 | IRL-2 | Comparison | P-3 | none | 0 | 200 |

TABLE 7-continued

| Inks | Ink jet recording media | Note | Polymer | Nanoclay (wt % in ink) | Dry Time, min | Coalescence |
|---|---|---|---|---|---|---|
| IM-6, IY-6 | IRL-2 | Invention | P-3 | Laponite RDS ™ (0.55) | 0 | 200 |
| CM-5, CY-5 | IRL-2 | Comparison | P-4 | none | 0 | 200 |
| IM-7, IY-7 | IRL-2 | Invention | P-4 | Laponite RDS ™ (0.55) | 0 | 200 |
| CM-6, CY-6 | IRL-2 | Comparison | P-5 | none | 1 | 200 |
| IM-8, IY-8 | IRL-2 | Invention | P-5 | Laponite RDS ™ (0.55) | 0 | 200 |
| CM-7, CY-7 | IRL-2 | Comparison | P-6 | none | 0 | 120 |
| IM-9, IY-9 | IRL-2 | Invention | P-6 | Laponite RDS ™ (0.55) | 0 | 200 |
| CM-8, CY-8 | IRL-2 | Comparison | P-7 | none | 1 | 140 |
| IM-10, IY-10 | IRL-2 | Invention | P-7 | Laponite RDS ™ (0.55) | 0 | 140 |
| CM-9, CY-9 | IRL-2 | Comparison | P-8 | none | 0 | 160 |
| IM-11, IY-11 | IRL-2 | Invention | P-8 | Laponite RDS ™ (0.55) | 0 | 180 |

TABLE 8

| Inks | Ink jet recording media | Note | Polymer | Nanoclay (wt % in ink) | Dry Time, min | Coalescence |
|---|---|---|---|---|---|---|
| CM-2, CY-2 | IRL-3 | Comparison | P-1 | none | 1 | 80 |
| IM-3, IY-3 | IRL-3 | Invention | P-1 | Laponite RDS ™ (0.55) | 1 | 120 |
| CM-3, CY-3 | IRL-3 | Comparison | P-2 | none | 1 | 60 |
| IM-5, IY-5 | IRL-3 | Invention | P-2 | Laponite RDS ™ (0.55) | 1 | 80 |
| CM-4, CY-4 | IRL-3 | Comparison | P-3 | none | 0 | 100 |
| IM-6, IY-6 | IRL-3 | Invention | P-3 | Laponite RDS ™ (0.55) | 0 | 120 |
| CM-5, CY-5 | IRL-3 | Comparison | P-4 | none | 0 | 100 |
| IM-7, IY-7 | IRL-3 | Invention | P-4 | Laponite RDS ™ (0.55) | 0 | 120 |
| CM-6, CY-6 | IRL-3 | Comparison | P-5 | none | 1 | 60 |
| IM-8, IY-8 | IRL-3 | Invention | P-5 | Laponite RDS ™ (0.55) | 1 | 100 |
| CM-7, CY-7 | IRL-3 | Comparison | P-6 | none | 0 | 80 |
| IM-9, IY-9 | IRL-3 | Invention | P-6 | Laponite RDS ™ (0.55) | 1 | 100 |
| CM-8, CY-8 | IRL-3 | Comparison | P-7 | none | 0 | 80 |
| IM-10, IY-10 | IRL-3 | Invention | P-7 | Laponite RDS ™ (0.55) | 0 | 100 |
| CM-9, CY-9 | IRL-3 | Comparison | P-8 | none | 1 | 100 |
| IM-11, IY-11 | IRL-3 | Invention | P-8 | Laponite RDS ™ (0.55) | 1 | 100 |

The above results demonstrate that the coalescence improvement may be achieved with many classes of polymers to varying degrees indicating the wide range of compatibility and application of smectite clay minerals in inks.

Experiment 3

Experiment 3 compared dry time and coalescence effects of inks using surface modified pigment dispersions MD-2 and YD-2 prepared from diazonium reaction. They were used in conjunction with polymer and swelling nanoclays in inks. Images 1 and 2 were printed on IRL-1, IRL-2 and IRL-3. The results of dry time and coalescence assessments are tabulated in Table 9 below. It is clearly shown that the addition of swelling clay in inks improves coalescence while maintaining satisfactory dry time, regardless of the pigment dispersion method.

TABLE 9

| Inks | Ink jet recording media | Note | Polymer | Nanoclay (wt % in ink) | Dry Time, min | Coalescence |
|---|---|---|---|---|---|---|
| CM-11, CY-11 | IRL-1 | Comparison | P-1 | none | 0 | 120 |
| IM-12, IM-12 | IRL-1 | Invention | P-1 | Laponite RDS™ (0.55) | 0 | 160 |
| CM-11, CY-11 | IRL-2 | Comparison | P-1 | none | 0 | 200 |
| IM-12, IM-12 | IRL-2 | Invention | P-1 | Laponite RDS™ (0.55) | 0 | 200 |
| CM-11, CY-11 | IRL-3 | Comparison | P-1 | none | 1 | 80 |
| IM-12, IM-12 | IRL-3 | Invention | P-1 | Laponite RDS™ (0.55) | 0 | 160 |

Experiment 4

Experiment 4 compared dry time and coalescence effects of an alternative smectite clay mineral in inks. In order to demonstrate that the effects are not limited to Laponite RDS™ alone, this experiment uses Cloisite Na+. Images 1 and 2 were printed on IRL-1, IRL-2 and IRL-3. The results of dry time and coalescence assessments are tabulated in Tables 10, 11 & 12 below.

TABLE 10

| Inks | Ink jet recording media | Note | Polymer in each ink | Nanoclay in each ink (wt % in ink) | Dry Time (minutes) | Coalescence |
|---|---|---|---|---|---|---|
| CM-2, CY-2 | IRL-1 | Comparison | P-1 | none | 1 | 80 |
| IM-13, IY-13 | IRL-1 | Invention | P-1 | Cloisite Na+ (0.55) | 0 | 140 |

TABLE 11

| Inks | Ink jet recording media | Note | Polymer in each ink | Nanoclay in each ink (wt % in ink) | Dry Time (minutes) | Coalescence |
|---|---|---|---|---|---|---|
| CM-2, CY-2 | IRL-2 | Comparison | P-1 | none | 0 | 180 |
| IM-13, IY-13 | IRL-2 | Invention | P-1 | Cloisite Na+ (0.55) | 0 | 200 |

TABLE 12

| Inks | Ink jet recording media | Note | Polymer in each ink | Nanoclay in each ink (wt % in ink) | Dry Time (minutes) | Coalescence |
|---|---|---|---|---|---|---|
| CM-2, CY-2 | IRL-3 | Comparison | P-1 | none | 1 | 80 |
| IM-13, IY-13 | IRL-3 | Invention | P-1 | Cloisite Na+ (0.55) | 1 | 100 |

What is claimed is:

1. An ink jet ink composition comprising water, a pigment dispersion, a polymer that is a polymeric binder, and a synthetic trioctahedral smectite clay mineral particles wherein the polymer is present in the ink jet ink from 0.1% to about 20% by weight based on the total weight of the ink composition; and the synthetic trioctahedral smectite clay mineral is present at a concentration from 0.05 to 10.0% by weight of the ink composition; wherein the clay particles and the polymeric binder are added to the ink composition as separate ingredients.

2. The composition of claim 1 wherein said pigment dispersion comprises a self-dispersed pigment or a pigment stabilized by a dispersant.

3. The composition of claim 1 wherein the polymer is present preferably from about 0.1% to about 10% by weight based on the total weight of the ink.

4. The composition of claim 1 wherein said trioctahedral smectite comprises saponite subgroup.

5. The composition of claim 4 wherein said saponite subgroup comprises hectorite, saponite, or sauconite.

6. The composition of claim 5 wherein said hectorite comprises laponite.

7. The composition of claim 6 wherein said laponite is $[(Si_8)^{IV}(Mg_{4.8}Li_{0.4})^{VI}O_{20}(OH)_4]_{1.34}Na^+$.

8. The composition of claim 1 wherein said smectite clay mineral is exfoliated.

9. The composition of claim 1 wherein said smectite clay mineral is intercalated.

10. The composition of claim 2 wherein said dispersant is a polymeric dispersant or a non-polymeric dispersant.

11. The composition of claim 1 wherein said polymeric binder is water dispersible or water soluble.

12. The composition of claim 1 wherein said polymer is a polyester ionomer, polyurethane or water-reducible addition polymer.

13. The composition of claim 1 wherein said synthetic trioctahedral smectite clay mineral comprises particles having dimensions of 0.2-3.0 nm by 10-150 nm.

14. The composition of claim 1 wherein said synthetic trioctahedral sinectite clay mineral comprises particles having dimensions of 0.2-2.0 nm by 10-125 nm.

15. The composition of claim 1 wherein said synthetic trioctahedral smectite clay mineral is present at a concentration from 0.05 to 3.0% by weight of said ink jet ink composition.

16. The composition of claim 1 wherein said pigment dispersion comprises pigment that is present at a concentration of from 0.2 to 15.0% by weight of said ink jet ink composition.

17. The composition of claim 1 wherein said pigment dispersion comprises pigment that is present at a concentration of from 0.5 to 10.0% by weight of said ink jet ink composition.

18. The composition of claim 1 wherein said pigment dispersion comprises particles of which at least 50% by weight are equal to or smaller than 150 nm.

19. The composition of claim 1 wherein said pigment dispersion comprises particles of which at least 50% by weight are equal to or smaller than 100 nm.

20. The composition of claim 1 wherein said pigment dispersion comprises particles of which at least 50% by weight of the pigment particles are equal to or smaller than 50 nm.

21. The composition of claim 1 wherein said pigment dispersion comprises particles of which at least 90% by weight of the pigment particles are equal to or smaller than 100 nm.

22. The composition of claim 1, further comprising a humectant.

23. The composition of claim 22 wherein said humectant is a polyhydric alcohol.

24. The ink jet ink composition of claim 12 wherein the addition polymer comprises monomers selected from the group consisting of allyl compounds, allyl esters, vinyl ethers, vinyl esters, vinyl heterocyclic compounds, styrene or a styrene derivative, olefins and halogenated olefins, itaconic acid and esters, crotonic acid and esters, unsaturated nitriles, acrylic acid or methacrylic acid and esters, vinyl alcohols, acrylamides and methacrylamnides, vinyl ketones, and multifunctional monomers.

25. The ink jet ink composition of claim 12 wherein the addition polymer comprises monomers selected from the group consisting of vinyl ethers, styrene and styrene derivatives, olefins and halogenated olefins, itaconic acid and esters and acrylic acid and methacrylic acid and esters.

26. The ink jet ink composition of claim 12 wherein 75 to 100% of the acid groups on the polymer is neutralized by alkaline metal hydroxide.

27. The ink jet ink composition of claim 26 wherein the alkaline metal hydroxide is lithium hydroxide, sodium hydroxide or potassium hydroxide, or a mixture thereof.

28. The composition of claim 22 wherein the humectant is from 1.0 to 50.0% by weight of the entire ink composition.

29. The composition of claim 22 wherein the humectant is from 5-40% by weight of the entire ink composition.

30. The composition of claim 12 wherein the addition polymer has a Tg of −40 to 200 degrees C.

31. The composition of claim 12 wherein the addition polymer has a Tg of 20 to 180 degrees C.

32. The composition of claim 12 wherein the addition polymer has a weight average molecular weight of 2,000 to 200,000.

33. The composition of claim 12 wherein the addition polymer has a weight average molecular weight of 4,000 to 40,000.

34. The composition of claim 12 wherein the addition polymer has a calculated add number of 50 to 400.

35. The composition of claim 12 wherein the addition polymer has a calculated acid number of 100 to 300.

36. The composition of claim 1 wherein said pigment is C.I. Pigment Blue 15:3, C.I. Pigment Red 122, C.I. Pigment Yellow 155, C.I. Pigment Yellow 74, bis(phthalocyanylalumino)tetraphenyldisiloxane or C.I. Pigment Black 7.

37. The composition of claim 12 wherein said polyester ionomer has the following general formula;

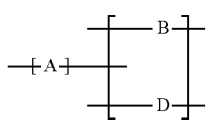

wherein:

A is the residue of one or more diol components which together comprise 100 mole % of recurring units and is represented by the following structure:

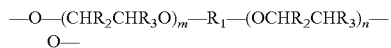

wherein:

m and n independently represent an integer from 0-4; $R_1$ represents S, an alkylene group of 1 to about 16 carbon atoms; a cycloalkylene group of 5 to about 20 carbon atoms; a cyclobisalkylene group of about 8 to about 20 carbon atoms, a bi- or tri-cycloalkylene group of about 7 to about 16 carbon atoms, a bi- or tri-cyclobisalkylene group of about 9 to about 18 carbon atoms, an arenebisalkylene group of from 8 to about 20 carbon atoms or an arylene group of 6 to about 12 carbon atoms, a carbinol-terminated polydimethylsiloxane segment; and $R_2$ and $R_3$ each independently represents H, a substituted or unsubstituted alkyl group of about 1 to about 6 carbon atoms or a substituted or unsubstituted aryl group of about 6 to about 12 carbon atoms; B is the residue of a diacid component which comprises 8 to 50 mole % of recurring units and is represented by one or more of the following structures:

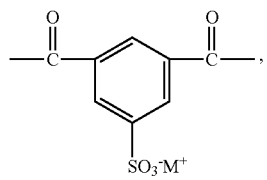

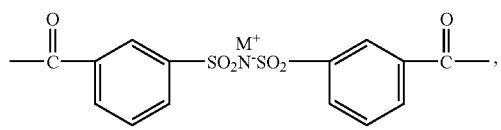

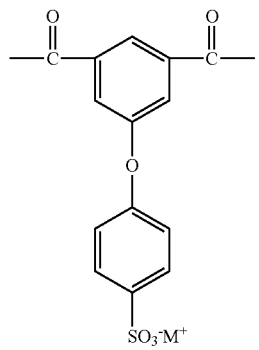

or

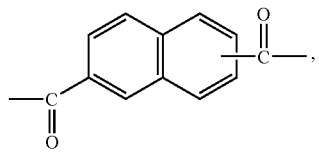

wherein:

$M^+$ represents an alkali metal; an ammonium group; a phosphonium group; a heteroaromatic ammonium group; a sulfonium group; a guanidinium group; or an amidinium group; and D is the residue of a diacid component which comprises 50 to 92 mole % of recurring units and is represented by one or more of the following structures:

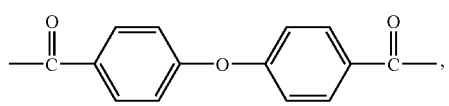

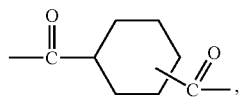

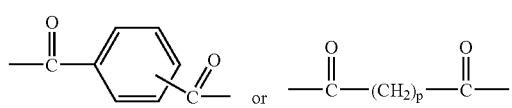

wherein p represents an integer from 2 to 12.

38. The composition of claim 12 wherein said polyurethane has the general formula:

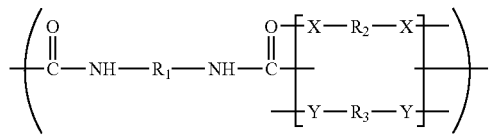

wherein $R_1$ represents the central portion of the monomeric unit that is the polymerization product of a diisocyanate monomer;
  $R_2$ represents the central portion of a monomeric unit that is the polymerization product of a diamine, a diol or a polyol;
  $R_3$ is the central portion of a monomeric unit containing a phosphonate, carboxylate or sulfonate group; and
  X and Y can be the same or different and are —O— or —N— atom,
  wherein $R_2$ represents the central portion of a monomeric unit that is the polymerization product of polyester polyol, polycarbonate polyol or polylactone polyol,
  wherein $R_2$ represents the central portion of a monomeric unit that is the polymerization product of carboxylic acid.

39. The composition of claim 12 wherein the polyurethane has a Tg of −40 to 200 degrees C.

40. The composition of claim 20 wherein the polyurethane has a Tg of 20 to 180 degrees C.

41. The composition of claim 12 wherein the polyurethane has a weight average molecular weight of 2,000 to 200,000.

42. The composition of claim 12 wherein the polyurethane has a weight average molecular weight of 4,000 to 100,000.

43. The composition of claim 12 wherein the polyurethane has a calculated acid number of 20 to 200.

44. The composition of claim 12 wherein the polyurethane has a calculated acid number of 20 to 160.

45. The composition of claim 12 wherein the polyurethane is neutralized by alkaline metal hydroxide or ammonium hydroxide 46. The composition of claim 1 wherein said polymer is a polyurethane or water-reducible addition polymer.

* * * * *

UNITED STATES PATENT AND TRADEMARK OFFICE
CERTIFICATE OF CORRECTION

PATENT NO. : 7,435,765 B2 Page 1 of 1
APPLICATION NO. : 10/313368
DATED : October 14, 2008
INVENTOR(S) : Tammy A. McCovick et al.

It is certified that error appears in the above-identified patent and that said Letters Patent is hereby corrected as shown below:

Column 25, claim 3, line 16, delete "preferably.".

Column 25, claim 14, line 43, delete "sinectite" and insert -- smectite --.

Column 26, claim 24, line 17, delete "methacrylamnides" and insert -- methacrylamides --.

Column 26, claim 34, line 49, delete "add" and insert -- acid --.

Signed and Sealed this

Twelfth Day of May, 2009

JOHN DOLL
*Acting Director of the United States Patent and Trademark Office*